(12) United States Patent
Papin et al.

(10) Patent No.: US 8,308,468 B2
(45) Date of Patent: Nov. 13, 2012

(54) APPARATUS AND METHOD FOR LOADING A TREAD PRESS

(75) Inventors: Bernard Papin, Greenville, SC (US); Theophile Henry Louchart, Roebuck, SC (US); William Gibbs Pike, Belton, SC (US)

(73) Assignees: Compagnie Generale des Etablissements Michelin, Clermont-Ferrand (FR); Michelin Recherche et Technique, Granges-Paccot (CH)

( * ) Notice: Subject to any disclaimer, the term of this patent is extended or adjusted under 35 U.S.C. 154(b) by 0 days.

(21) Appl. No.: 13/427,449

(22) Filed: Mar. 22, 2012

(65) Prior Publication Data

US 2012/0177764 A1 Jul. 12, 2012

Related U.S. Application Data

(62) Division of application No. 11/191,816, filed on Jul. 28, 2005, now Pat. No. 8,236,228.

(51) Int. Cl.
*B29C 43/34* (2006.01)
(52) U.S. Cl. ........................... 425/193; 425/397
(58) Field of Classification Search .......... 425/520–521, 425/193, 383, 397
See application file for complete search history.

(56) References Cited

U.S. PATENT DOCUMENTS

| 1,986,092 A | | 1/1935 | Abbott, Jr. | |
|---|---|---|---|---|
| 3,966,380 A | | 6/1976 | Kosik, Jr. | |
| 3,981,669 A | * | 9/1976 | Gambill et al. | 425/397 |
| 5,267,848 A | * | 12/1993 | Totsuka | 425/297 |

FOREIGN PATENT DOCUMENTS

| CA | 940671 A1 | 1/1974 |
|---|---|---|
| DE | 20 32 246 A1 | 1/1972 |
| JP | 02 167733 A | 6/1990 |
| JP | 2001 001358 A | 1/2001 |

OTHER PUBLICATIONS

Supplementary European Search Report for EP 06 78 6983, Feb. 24, 2010.
Six (6) photographs of a press manufactured in 1998 by G. Siempelkamp GmbH & Co., Maschinen—und Anlagenbau Siempelkampstrasse 75 D-47803 Krefeld.

* cited by examiner

*Primary Examiner* — Richard Crispino
*Assistant Examiner* — Thukhanh Nguyen
(74) *Attorney, Agent, or Firm* — Dority & Manning, P.A.

(57) ABSTRACT

An apparatus and method for loading a tread press are provided. More specifically, the present invention provides for loading a tread band onto a tread press while suspending the tread band above the mold elements as the tread band is moved into the proper longitudinal position within the tread press. Lateral positioning can also be provided using the present invention.

10 Claims, 17 Drawing Sheets

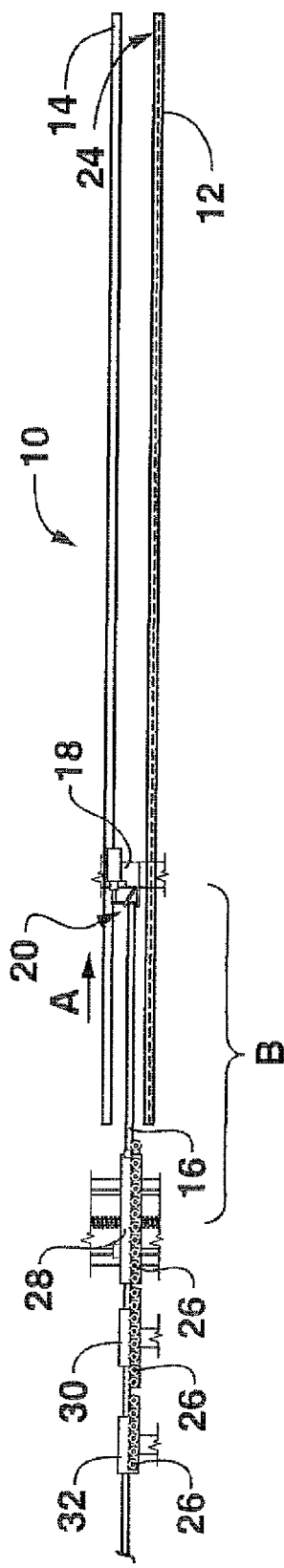
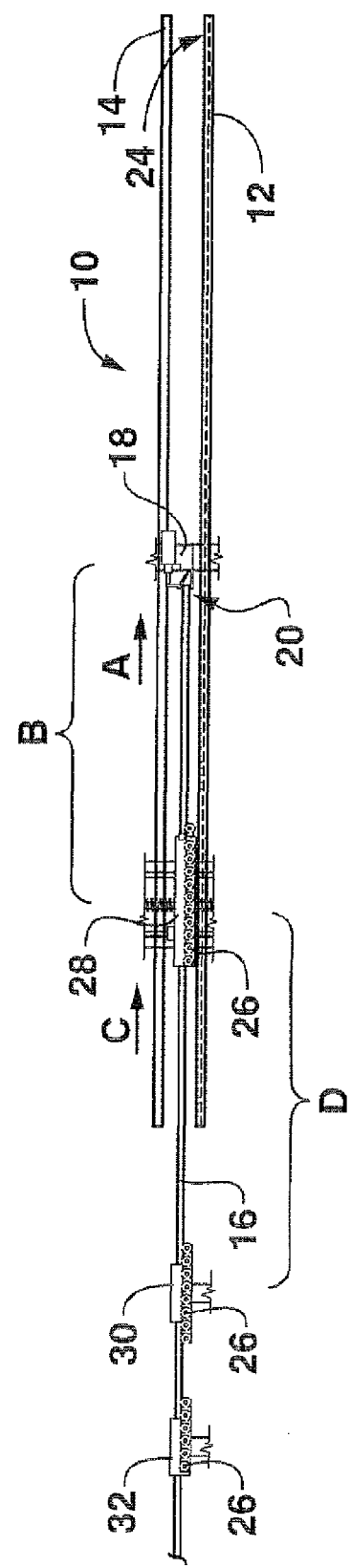
FIG. 1A
FIG. 1B

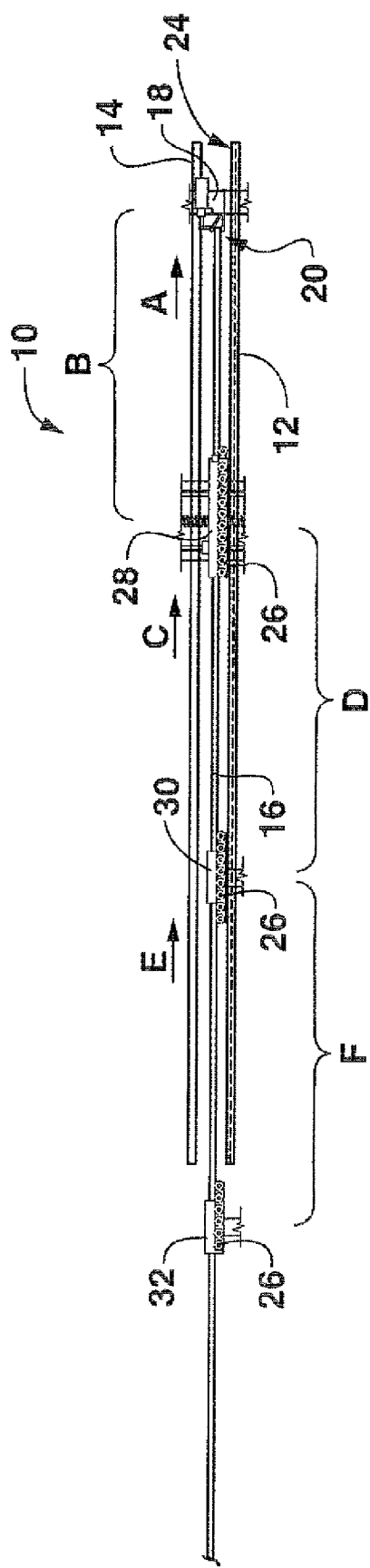
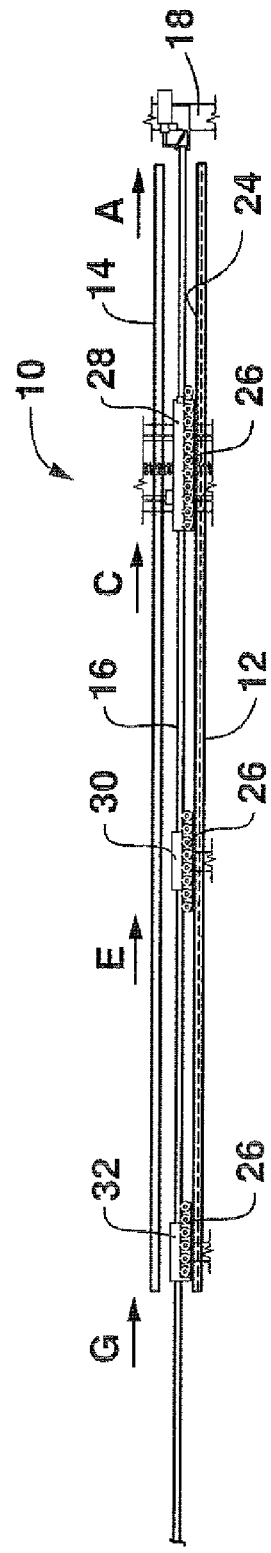
FIG. 1C
FIG. 1D

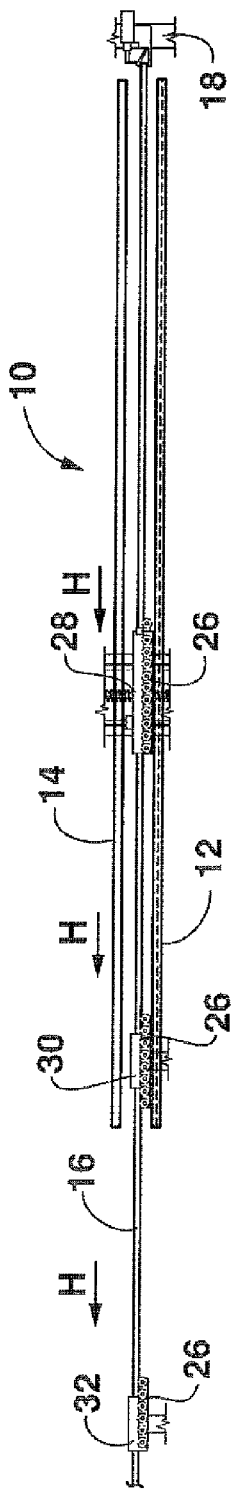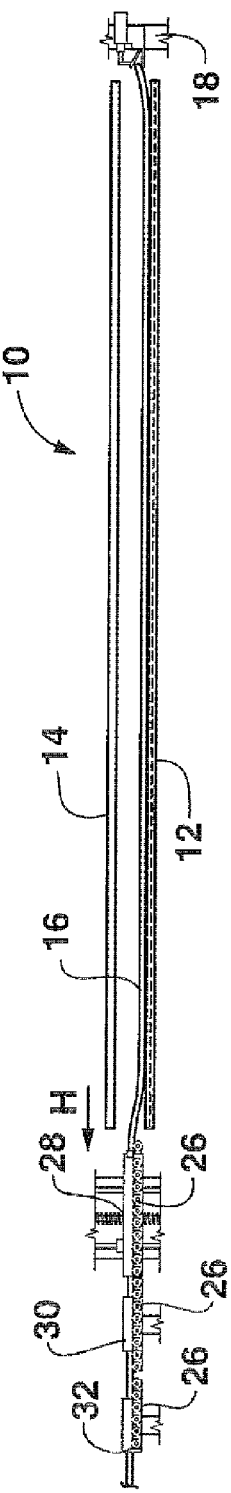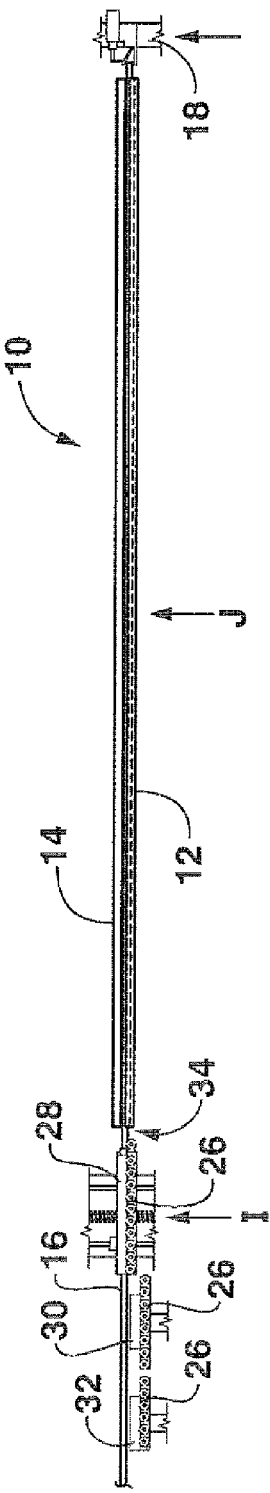

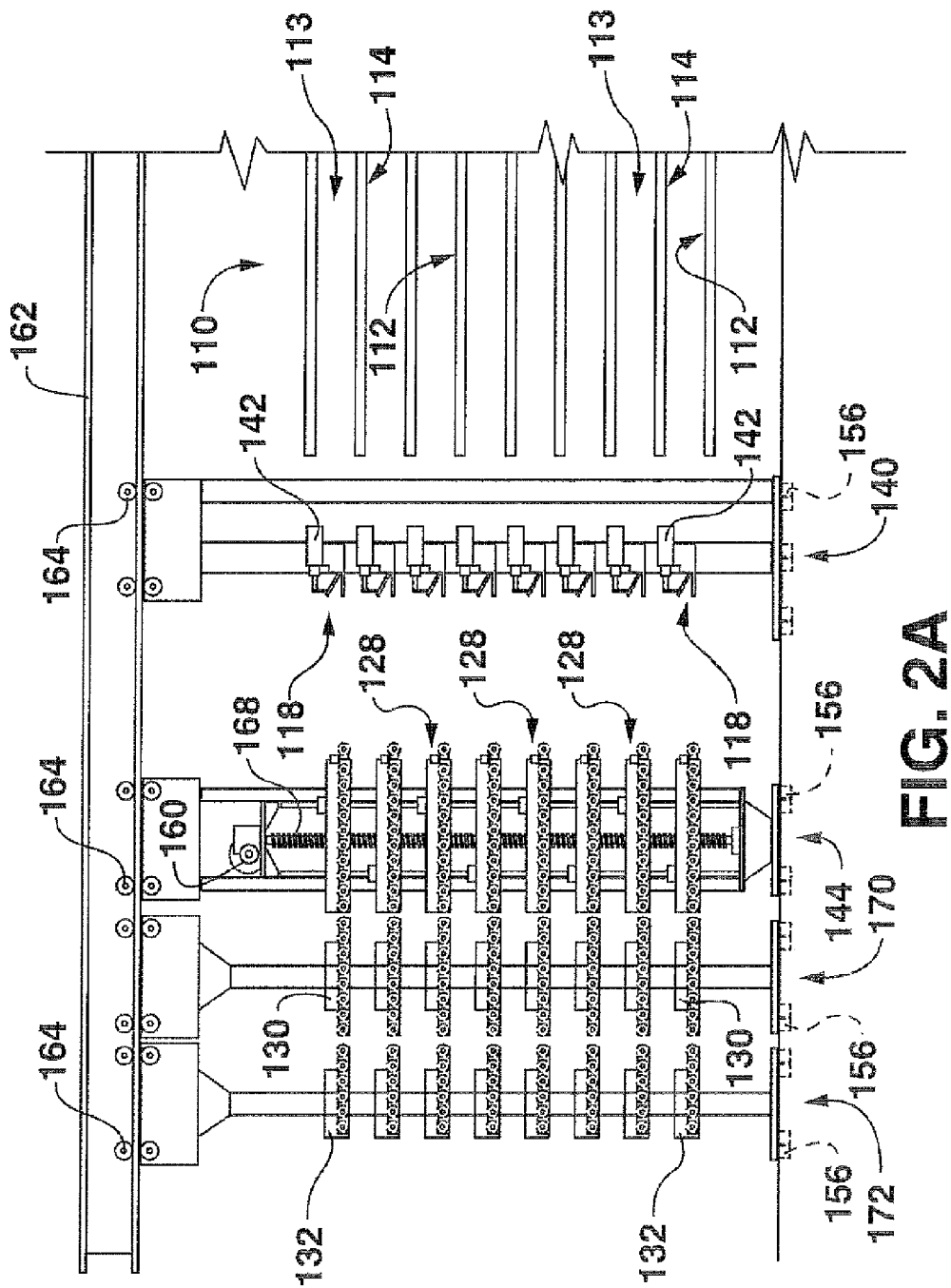

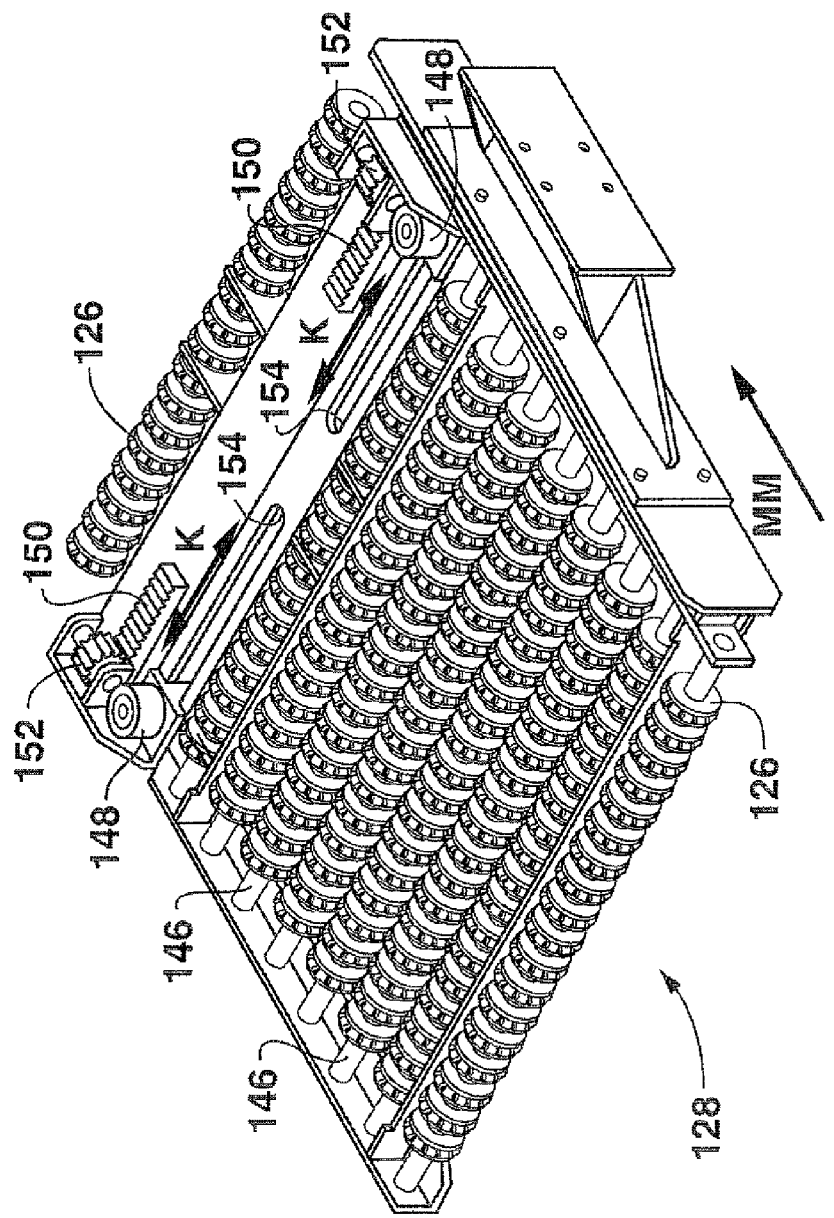

APPARATUS AND METHOD FOR LOADING A TREAD PRESS

PRIORITY CLAIM

This application is a divisional application of and claims priority to U.S. patent application Ser. No. 11/191,816 filed on Jul. 28, 2005, now U.S. Pat. No. 8,236,228 which is incorporated herein by reference for all purposes.

TECHNICAL FIELD OF THE INVENTION

The present invention provides an apparatus and method for loading a tread press. More specifically, the present invention provides for loading a tread band onto a tread press while suspending the tread band above the mold elements as the tread band is moved into the proper longitudinal position within the tread press. Lateral positioning can also be provided using the present invention.

BACKGROUND OF THE INVENTION

Retreaded tires are commercially available and provide an economical option to obtaining additional use of a tire after the tread has worn. The conventional process of retreading generally includes application of a length of tire tread, referred to herein as a tread band, to a tire casing from which the original tread band or a retread band has been removed. Prior to such application, the new tread band is manufactured by a process that includes providing tread features or tread sculpture to the tread band by means of a press operation.

Conventionally, the press is loaded by using a machine to drag the uncured tread band across the longitudinal length of the tread press until the tread is located in the proper longitudinal position. Lateral positioning of the uncured tread band in the tread press is manually provided. Unfortunately, such conventional method can lead to a waste of material and manufacturing complexities. For example, because the tread band might be stretched as it is as dragged across the press, additional thickness is sometimes added to the tread band to compensate for the stretching. Even with such compensation, such stretching may not occur uniformly along the length of the band. Improper lateral positioning may require discarding a certain section of the tread band. Manually checking and correcting the lateral position can be time and labor intensive.

Accordingly, it would be desirable to provide an automated apparatus and method for loading a tread press that solves these and other complexities. An apparatus and method that further automates the tread loading process is also desirable. As will now be described, the present invention provides these and other advantages.

THE SUMMARY OF THE INVENTION

Various features and advantages of the invention will be set forth in part in the following description, or may be apparent from the description. The present invention provides a method of loading a tread press. In one exemplary method according to the present invention, such a method is provided for a tread press having a top mold element and a bottom mold element, the tread press defining a longitudinal direction. This exemplary method includes providing at least one tread band for molding with the tread press, seizing a first end of the tread band, moving the tread band along the longitudinal direction into a position between the top and bottom mold elements while suspending the tread band over the bottom mold element, and lowering the tread band onto the bottom mold element. The method may include the additional steps of pulling the tread band in the longitudinal direction while suspending it above the bottom mold element, providing at least one support under and in contact with the tread band while pulling the tread band, and moving the at least one support longitudinally along with the tread band during the step of pulling the tread band. The support assists in the suspension of the tread band above the bottom mold element. The support may allow the tread band to be freely movable with respect to the support. A plurality of supports may be used to assist in suspending the tread band.

Various modifications and additional steps may be included. For example, a method of loading a tread press may include moving the at least one support after the tread band has been pulled for a predetermined distance. A step of laterally positioning the tread band may be included, which can be also be performed during the step of lowering the tread band. The tread band may be pressed by moving the second mold element towards the first mold element. A second end of the tread band may be simultaneously moved with the second mold element during such pressing. Also, the exemplary methods just referenced may include the step of laterally positioning the tread band during the step of lowering the tread band. Also, the above exemplary methods may be used simultaneously for loading multiple tread bands onto a press having multiple such levels.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 1A through 1G provide a schematic representation of an exemplary apparatus and method of the present invention as may be used for manufacturing a single layer of tread band.

FIGS. 2A through 2J, using an elevational view of another exemplary embodiment of the present invention, illustrate another exemplary method of the present invention as may be used for manufacturing multiple tread bands simultaneously.

FIGS. 4A and 4B provides a perspective view that depicts the operation of other elements of the exemplary embodiment shown within FIGS. 2A through 2J.

Repeat use of identical or similar reference characters throughout the present specification and appended drawings is intended to represent same or analogous features or elements of the invention.

DETAILED DESCRIPTION

Figure 2B:
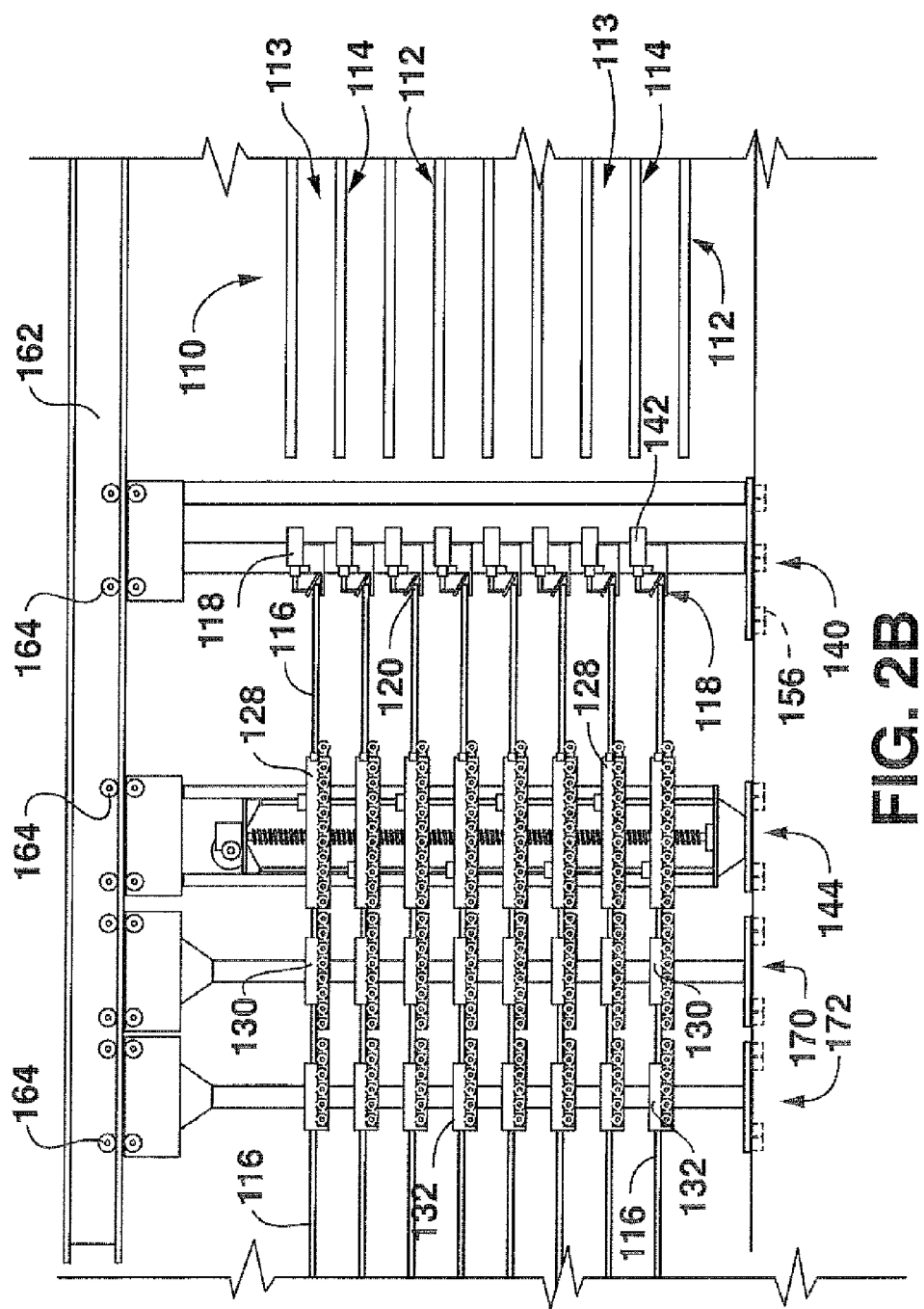

Various features and advantages of the invention will be set forth in part in the following description, or may be obvious from the description. The present invention provides an apparatus and method for loading a tread press that suspends the tread band above certain elements of the tread press until the tread band is properly positioned longitudinally along the length of the tread press. Elements for executing a lateral positioning step may also be provided.

In one exemplary embodiment a single-layer, tread band press 10 is provided as is illustrated in FIGS. 1A though 1G. Press 10 includes a mold element 12 and a mold back 14. Mold element 12 includes sculptures (represented schematically by a dashed-line) that create the tread features that are to be molded into tread band 16.

In one exemplary method according to the present invention, the process for loading tread band 16 into press 10 begins by pulling tread band 16 in the longitudinal direction or in a direction along the length of press 10 as is illustrated by arrow A in FIG. 1A. As shown, clamp 18 grabs a first end 20 of tread band 16 and pulls along longitudinal direction A. Note that due to a slight tension, tread band 16 remains suspended above mold element 12. More specifically, tread band 16 is not dragged across the surface 24 of mold element 12 but remains suspended above to prevent band 16 from being snagged or stretched. Tread band 16 is fed across rollers 26 on a first support 28, a second support 30, and a third support 32. It should be understood that the term suspended, as used in this specification, means that a tread band is supported over a mold element in a manner that reduces or minimizes the tension that would otherwise occur without suspension. Notably, it is within the spirit and scope of the present invention that some contact between the tread band and the mold element may still occur—i.e. the tread band may not be completely suspended at all points along its length. Nevertheless, the advantages of the present invention in reducing tension in the tread band can still be achieved in such embodiments.

After clamp 18 has carried first end 20 of tread band 16 a predetermined distance B (FIG. 1A), first support 28 also begins to move along the longitudinal direction of the machine as indicated by arrow C in FIG. 1B. Such movement with tread band 16 provides continued support and suspension of tread band 16 above mold element 12. Preferably, clamp 18 and first support 28 move substantially at the same speed in order to maintain predetermined distance B therebetween. However, it should be understood that the present invention includes embodiments where first support 28 and clamp 18 are moved at different speeds and times relative to one another.

Similarly, after first support 28 has moved a predetermined distance D (FIG. 1B), second support 30 begins to move along the longitudinal direction of the machine as indicated by arrow E to provide continued support and suspension of tread band 16. Second support 30 moves at substantially the same speed as first support 28 in order to maintain predetermined distance D therebetween. Once second support 30 has moved a predetermined distance F (FIG. 1C), third support 32 begins to move along the longitudinal direction of the machine as indicated by arrow G. As such, tread band 16 is now supported above mold element 12 in at least three positions: the first 28, second 30, and third 32 supports respectively. Using the teachings disclosed herein, one of ordinary skill in the art will appreciate that more or fewer supports may be used depending upon the weight and overall length of tread band 16.

Once the tread band 16 has been extended along the length of mold 10, supports 28, 30, and 32 are retracted as shown by arrows H in FIG. 1E. Each support is withdrawn sequentially and preferably at the same time until each are returned to the starting position shown in FIG. 1F. As supports 28, 30, and 32 are retracted, clamp 18 remains in place and holds tread band 16 in position. Additionally, as the supports are retracted, tread band 16 may remain in tension over mold element 12. However, as shown in FIG. 1F and depending upon its weight and length, tread band 16 falls into position on mold element 12 as the first support 28 is retracted. As will be discussed with another embodiment of the present invention to be later described, first support 28 ensures that tread band 16 is properly positioned laterally by guiding tread band 16 into place as first support 28 is withdrawn to its starting position as shown in FIG. 1E. Such lateral positioning may be accomplished, for example, using lateral alignment rollers as will be described later herein.

As depicted by arrow J in FIG. 1G, tread band press 10 is now closed by lifting mold element 12 so as to press tread band 16 against mold back 14 and thereby impress tread band 16 with the desired tread features. In order to alleviate tension in tread band 16 at feed point 34, first support 28 is provided with a lift mechanism 36 by which rollers 26 on first support 28 can be lifted as shown by arrow I in FIG. 1G. Using the teachings disclosed herein, it will be understood by one of ordinary skill in the art that mold back 14 and mold element 12 can be switched such that mold back 14 is below tread band 16 and mold element 12 is above. These and other variations are within the scope of the present invention. Once tread band 16 has been molded, mold element 12 is lowered and tread band 16 is removed for further manufacturing.

As will now be described, the present invention may be utilized to mold multiple tread bands simultaneously using a press having multiple levels. Referring now to FIGS. 2A through 2J, a tread band press 110 is provided that can mold up to eight tread bands 116 simultaneously. Tread band press 110 is constructed with eight vertically distinct molding levels 113. Each level 113 includes a mold element 112 and a mold back 114. It is within the spirit and scope of the present invention to use a different number of levels and other mold press 110 configurations.

Press 110 includes clamp column 140, which carries eight clamps 118 with each at a different vertical level. Clamps 118 are each powered and controlled by a clamp control mechanism 142. As such, clamps 118 can be activated to simultaneously grab or select tread band 116. While a clamping type mechanism is preferred, other means of grasping or selecting the first end 120 of tread band 116 may be utilized.

Figure 4B:
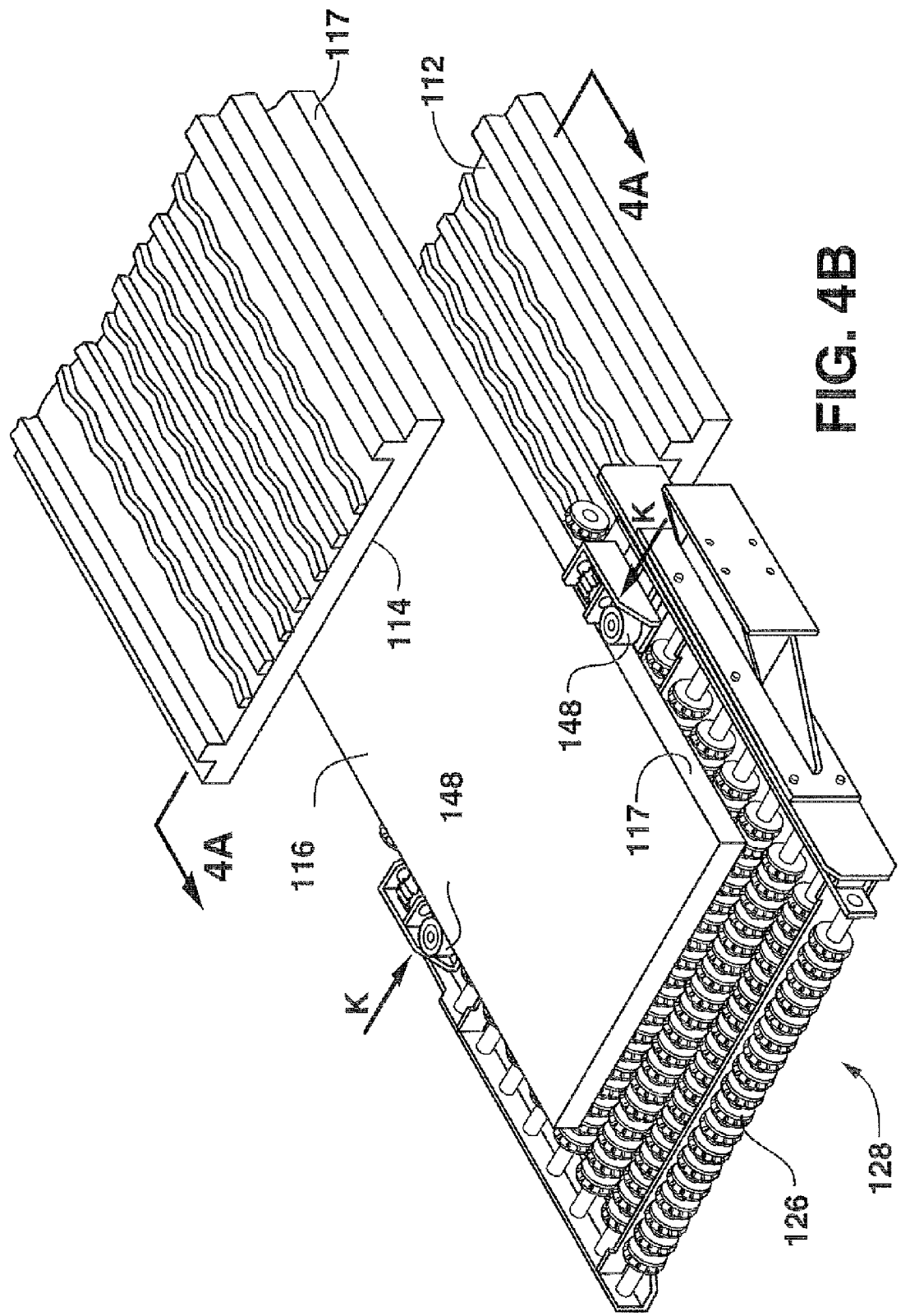
Figure 5A:
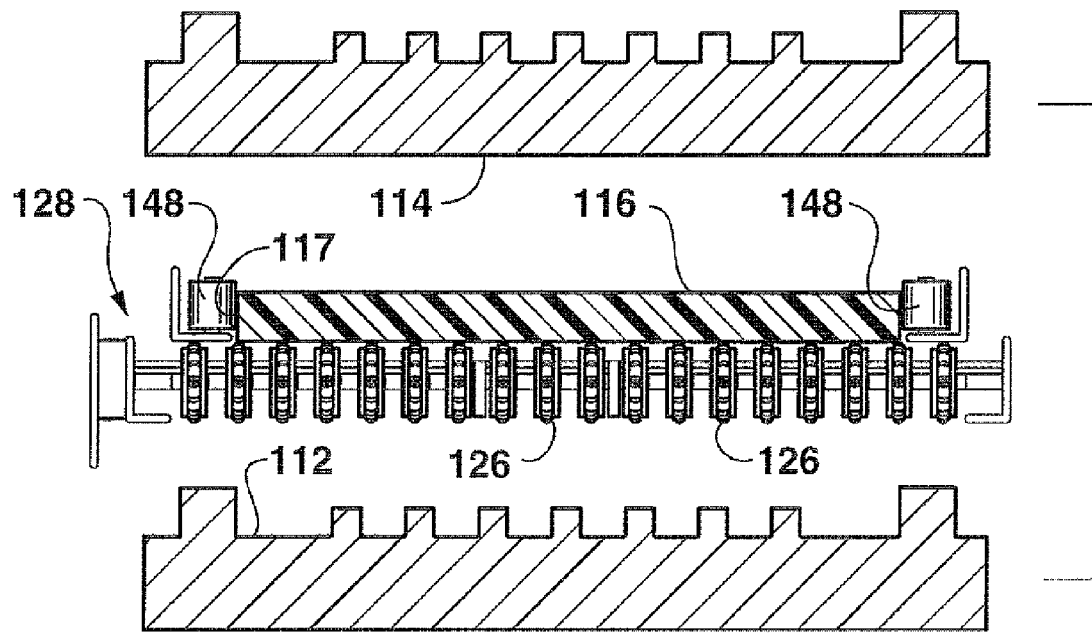
FIGS. 5A and 5B provide a cross-sectional view that depicts the operation of certain elements of the exemplary embodiment shown within FIGS. 2A through 2J and FIGS. 4A and 4B.

As shown in FIGS. 2A through 2J, first support column 144 carries a series of first supports 128 that are selectively positionable at vertically distinct levels. Referring now to FIG. 4A, each first support 128 includes a series of multi-directional rollers 126 that allow tread band 116 to move across freely. Multiple rollers 126 are carried on a series of bars 146 that are placed in side-by-side fashion along the longitudinal direction MM of the machine. First support 128 also includes a pair of lateral alignment rollers 148. Each roller 148 can be adjusted for the width of tread band 116 using rack 150 and pinion 152. More specifically, rack 150 and pinion 152 moves with roller 148 to position roller 148 along slot 154 as shown by arrows K. Referring to FIG. 4B and 5A, as shown tread band 116 moves across and is supported by rollers 126 on first support 128, lateral alignment rollers 148 contact the sides 117 of tread band 116 to provide proper lateral positioning.

Figure 3:
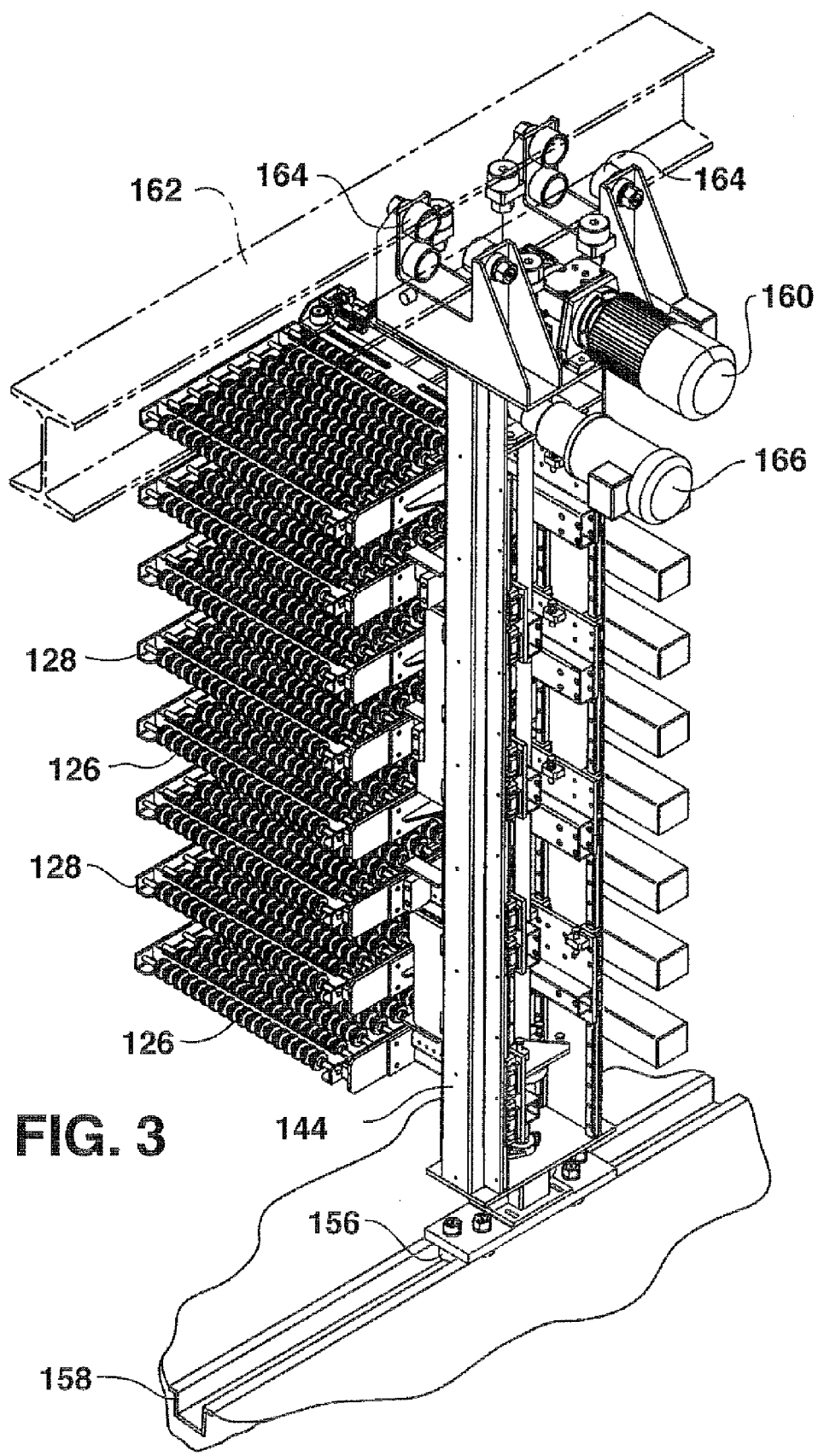
FIG. 3 provides a perspective view of an element of the exemplary embodiment shown within FIGS. 2A through 2J.

As shown in FIG. 3, first support column 144, which carries the series of first supports 128, rides along rollers 156 constrained within floor track 158. Locomotion is provided by motor 160, which moves first support column 144 along rail 162 using multiple rollers 164. Using the teachings disclosed herein, one of ordinary skill in the art will understand that a control system (not shown) can be used in conjunction with motor 160 to position first support column 144 as desired along with the length of the press 110.

In a manner similar to that which was previously discussed with regard to the exemplary method and embodiment of FIGS. 1A-1G, first support column 144 includes a motor 166 and screw drive 168 (FIG. 2A) for powering the vertical movement of first supports 128 along first support column 144. As such, the vertical position of each first support 128 can be controlled to reduce the tension of tread band 116 when tread band press 110 is closed.

Referring again to FIGS. 2A through 2J, tread band press 110 also includes a second support column 170 that carries a series of second supports 130 that are positioned at vertically distinct levels. Similarly, press 110 includes a third support column 172 that carries a series of third supports 132 that are also positioned at vertically distinct levels. As with first supports 128 second and third supports 130 and 132 each have a series of rollers 126 carried on multiple bars 146 that allow tread band 116 to move thereon freely. As with first support column 144, second and third support columns 170 and 172 each are powered by a motor 160 that provides for the longitudinal positioning of these columns along press 110 using multiple rollers 164. Second and third support columns 170 and 172 also ride on rollers 156 in floor track 158. However, for the embodiment shown in the figures, second and third support columns 170 and 172 do not include motor 166 or screw drive 168. More specifically, the vertical position of the series of second and third supports 130 and 132 is fixed and is not selectively adjustable as with the series of first supports 128. It should be understood, however, that vertical adjustability may be provided if needed with either or both of second and third support columns 170 and 172.

An exemplary method of loading tread band press 110 will now be further described beginning with FIG. 2B. As shown therein, clamps 118 begin the process of loading press 110 by grasping first end 120 of each of the tread bands 116. Tread bands 116 are fed from a supply (not shown) through third support column 172, second support column 170, and first support column 144. Accordingly, as clamp column 140 pulls tread band 116 towards tread band press 110, tread band 116 rolls freely across the multiple rollers 126 on each of the series of first, second, and third supports, 128, 130, and 132 respectively.

Figure 2C:
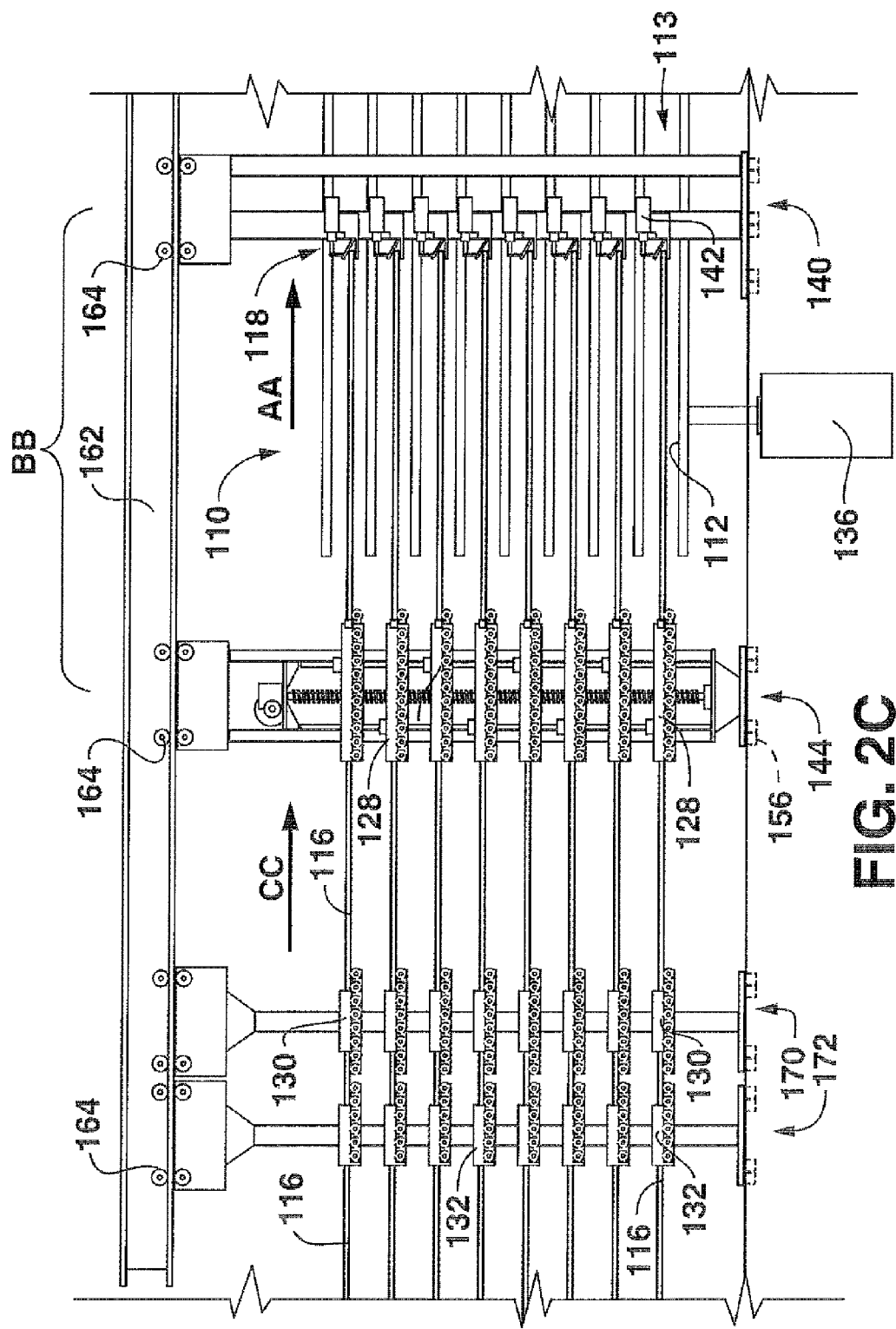

Referring now to FIG. 2C, clamp column 140 pulls multiple tread bands 116 into the mold levels 113 of tread band press 110 as indicated by arrow AA. As previously described, due to a slight tension, tread bands 116 remain suspended above mold elements 112. More specifically, tread bands 116 are not dragged across mold elements 112 but remain suspended above to prevent bands 116 from being snagged or stretched. Once clamp column 140 has moved a predetermined distance BB, first support column 144 begins to move towards tread band press 110, as indicated by arrow CC, in order to maintain the suspension of tread band 116 above mold elements 112. Preferably, clamp column 140 and first support column 144 move substantially at the same speed in order to maintain predetermined distance BB therebetween.

Figure 2D:
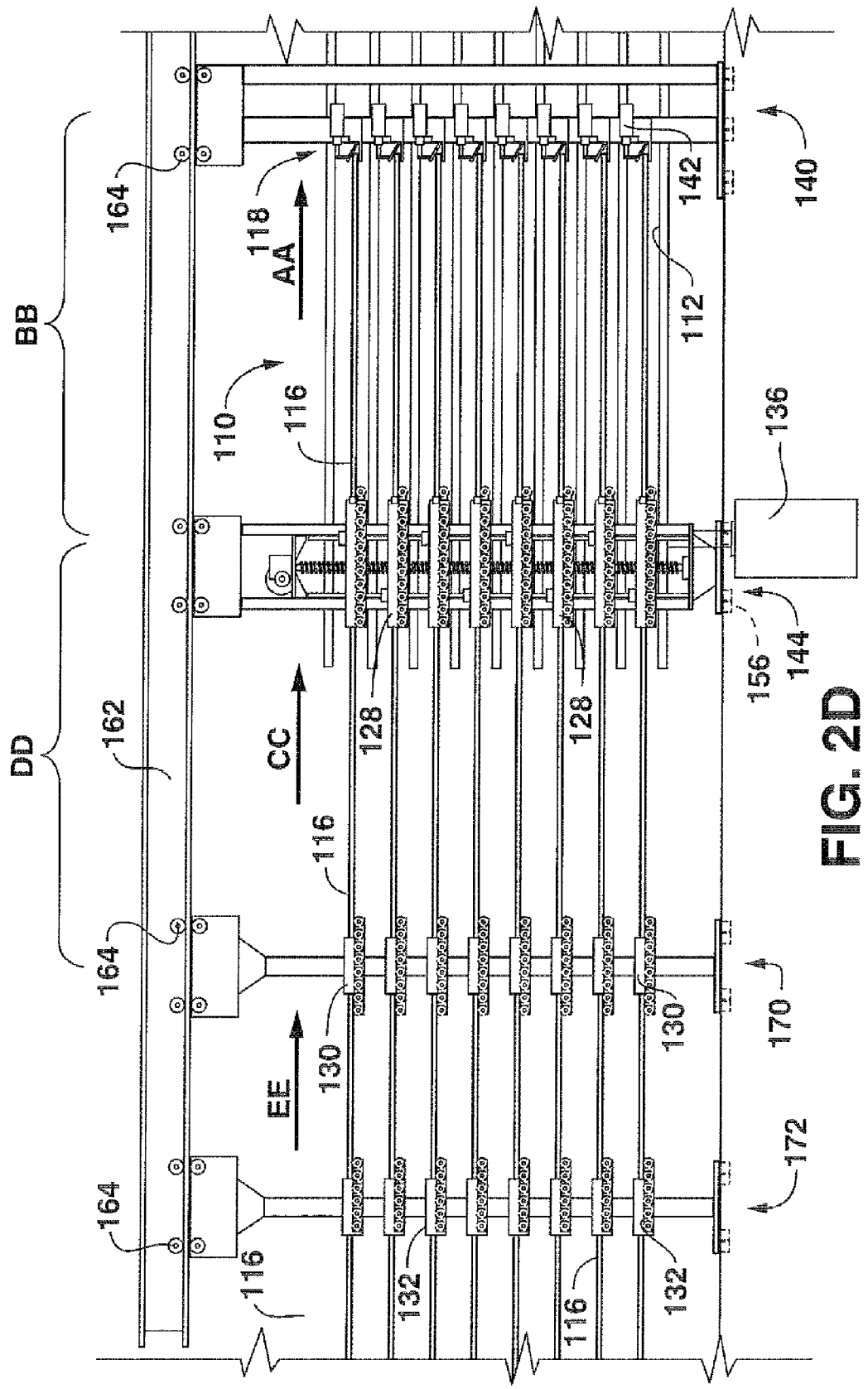

As shown in FIG. 2D, after first support column 144 has moved a predetermined distance DD, second support column 170 begins to move along the longitudinal direction of the machine as indicated by arrow EE to provide continued support and suspension of tread bands 116. Second support column 170 moves at substantially the same speed as first support column 144 in order to maintain predetermined distance DD therebetween. As with first support column 144, second support column 170 acts to maintain the suspension of tread bands 116 above mold elements 112 as clamp column 140 continues to pull additional length of tread bands 116 into tread band press 110.

Figure 2E:
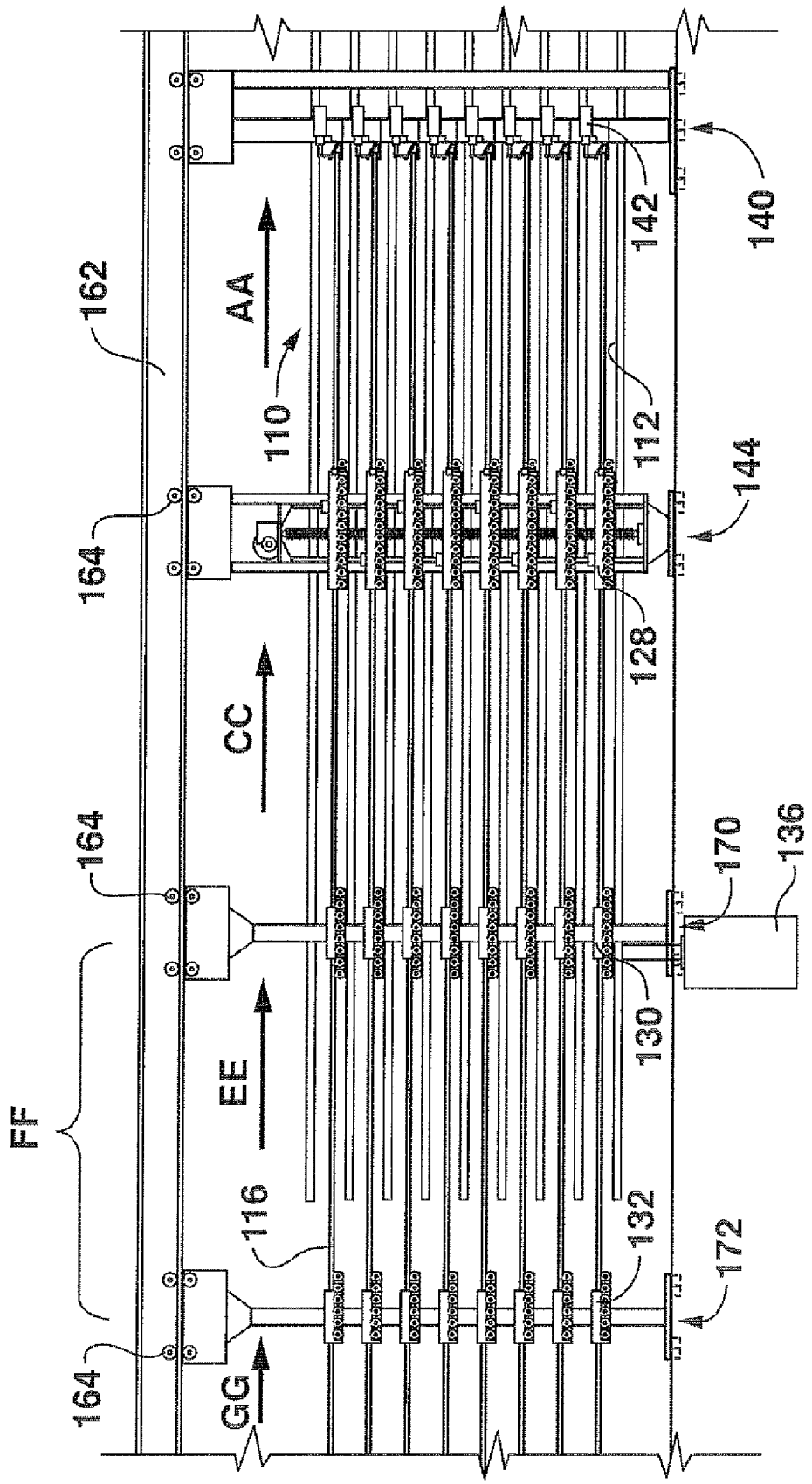
Figure 2F:
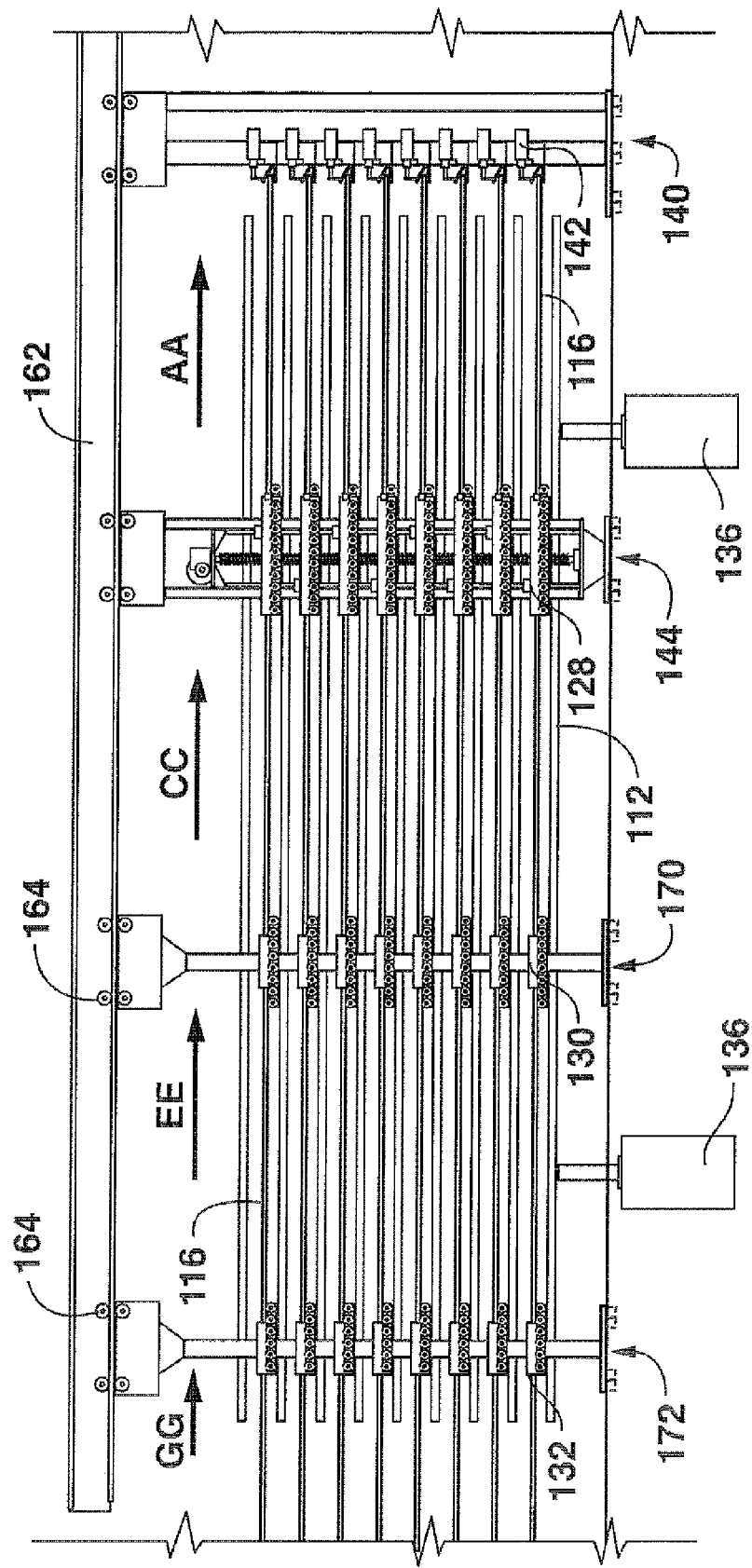

Turning now to FIG. 2E, once second support column 170 moves a predetermined distance FF, third support column 172 begins to move along the longitudinal direction of the machine as indicated by arrow GG. Preferably, third support column 172 moves at substantially the same speed as second support column 170 in order to maintain predetermined distance FF therebetween. As tread bands 116 continue to travel into tread band press 110, FIG. 2F illustrates that each tread band 116 is supported above a respective mold element 112 in at least three positions by the series of first 128, second 130, and third 132 supports respectively. Using the teachings disclosed herein, one of ordinary skill in the art will appreciate that more or fewer supports may be used depending upon the weight and overall length of tread bands 116.

Figure 2G:
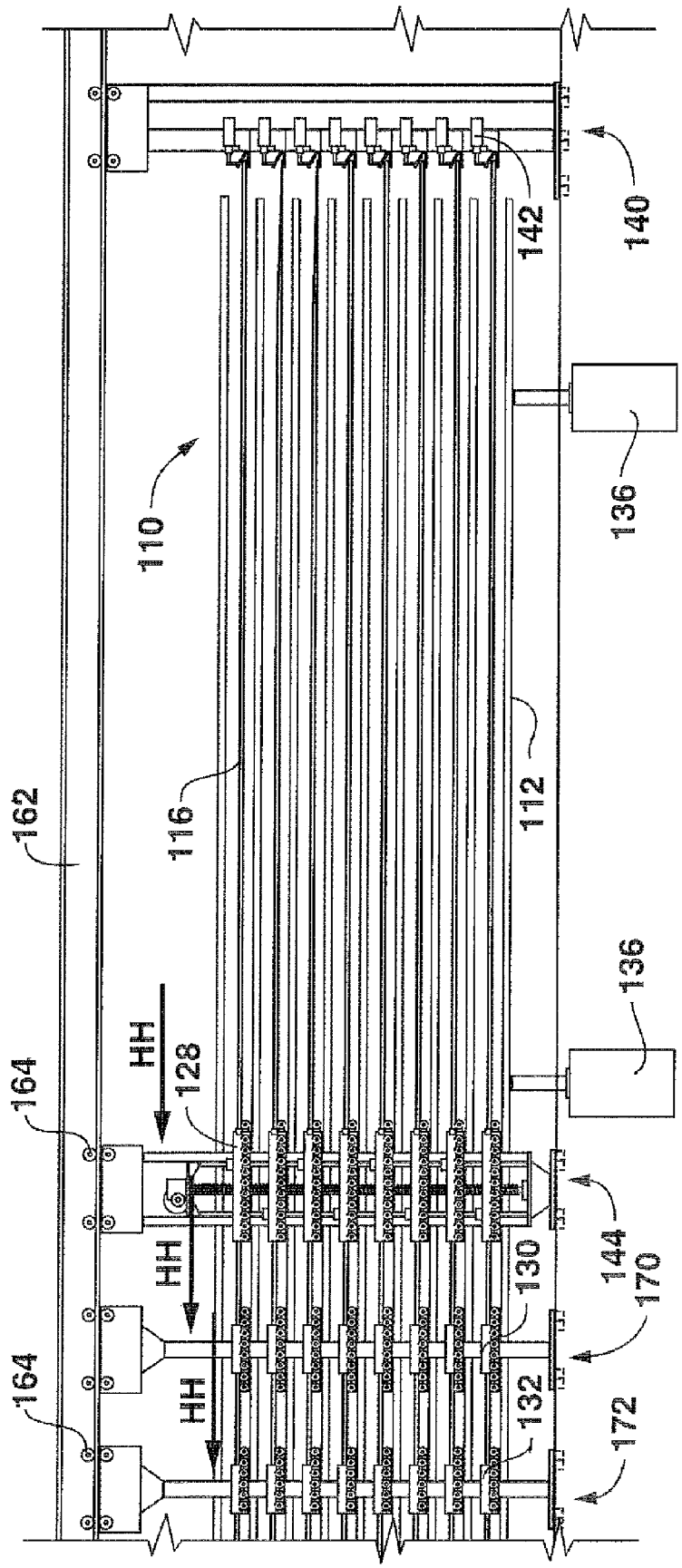
Figure 2H:
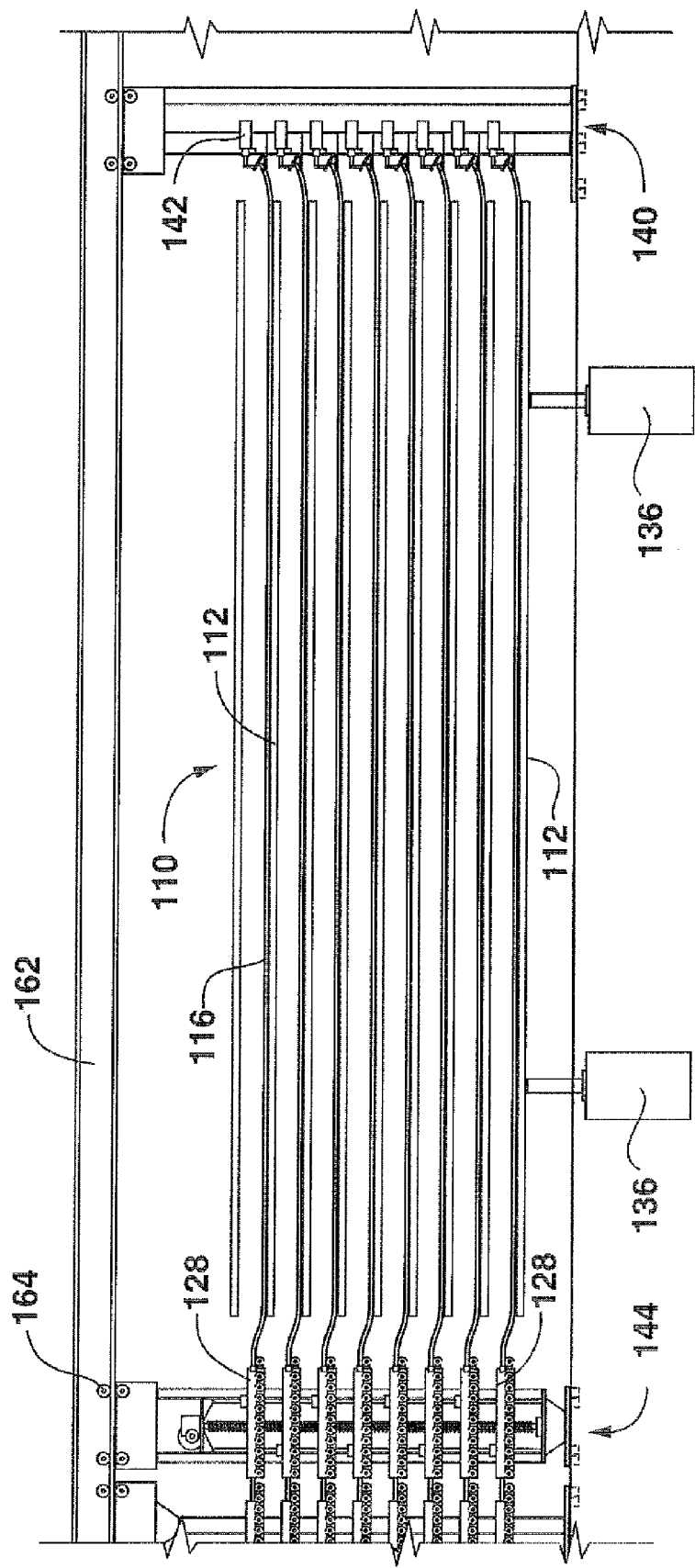
Figure 21:
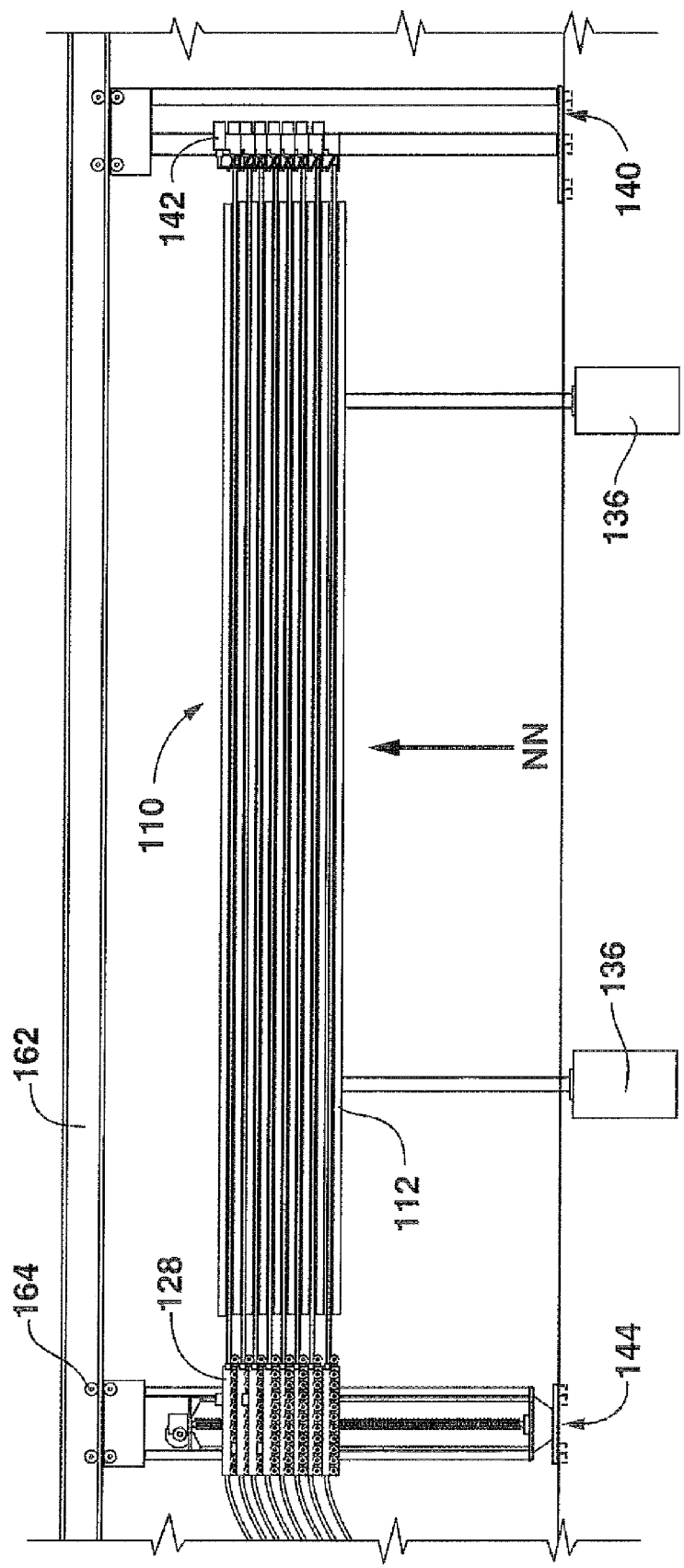

Once tread bands 116 are extended along the length of tread band press 110, the series of first 128, second 130, and third supports 132 supports are withdrawn by the movement of the respective support columns 144, 170, and 172 as shown by arrows HH in FIG. 2G. Each support column is withdrawn sequentially and preferably at the same time until each are returned to the starting position shown in FIG. 2H. As supports 128, 130, and 132 are retracted, clamps 118 remain in place and hold tread bands 116 in place longitudinally. In a manner as previously described with regard to FIGS. 4A, 4B, and 5A, as first column 144 is retracted lateral alignment rollers 148 on each support 128 provide the proper lateral positioning of tread bands 116 while rolling along sides 117. As shown in FIG. 2H and depending upon the weight and length, tread bands 116 fall into position on mold element 12 as first support column 144 is retracted.

Figure 5B:
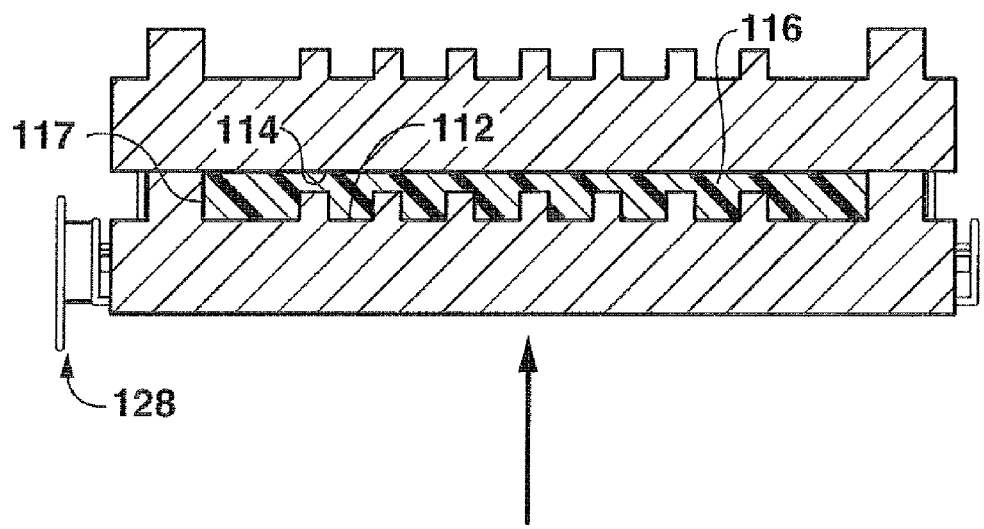

As depicted by arrow NN in FIG. 2I, tread band press 110 is now closed by lifting mold elements 112 using hydraulic lift mechanism 136. Such lifting presses tread bands 116 against mold backs 114 and thereby impresses tread bands 116 with the desired tread features as shown in FIG. 5B. In order to alleviate tension in tread bands 116 at feed point 134, the series of first supports 128 on first support column 144 are lifted using motor 166 and screw drive 168 as discussed above with regard to FIG. 3. Using the teachings disclosed herein, it will be understood by one of ordinary skill in the art that mold back 114 and mold element 112 can be switched such that mold back 114 is below tread band 116 and mold element 112 is above. These and other variations are within the scope of the present invention.

Figure 2J:
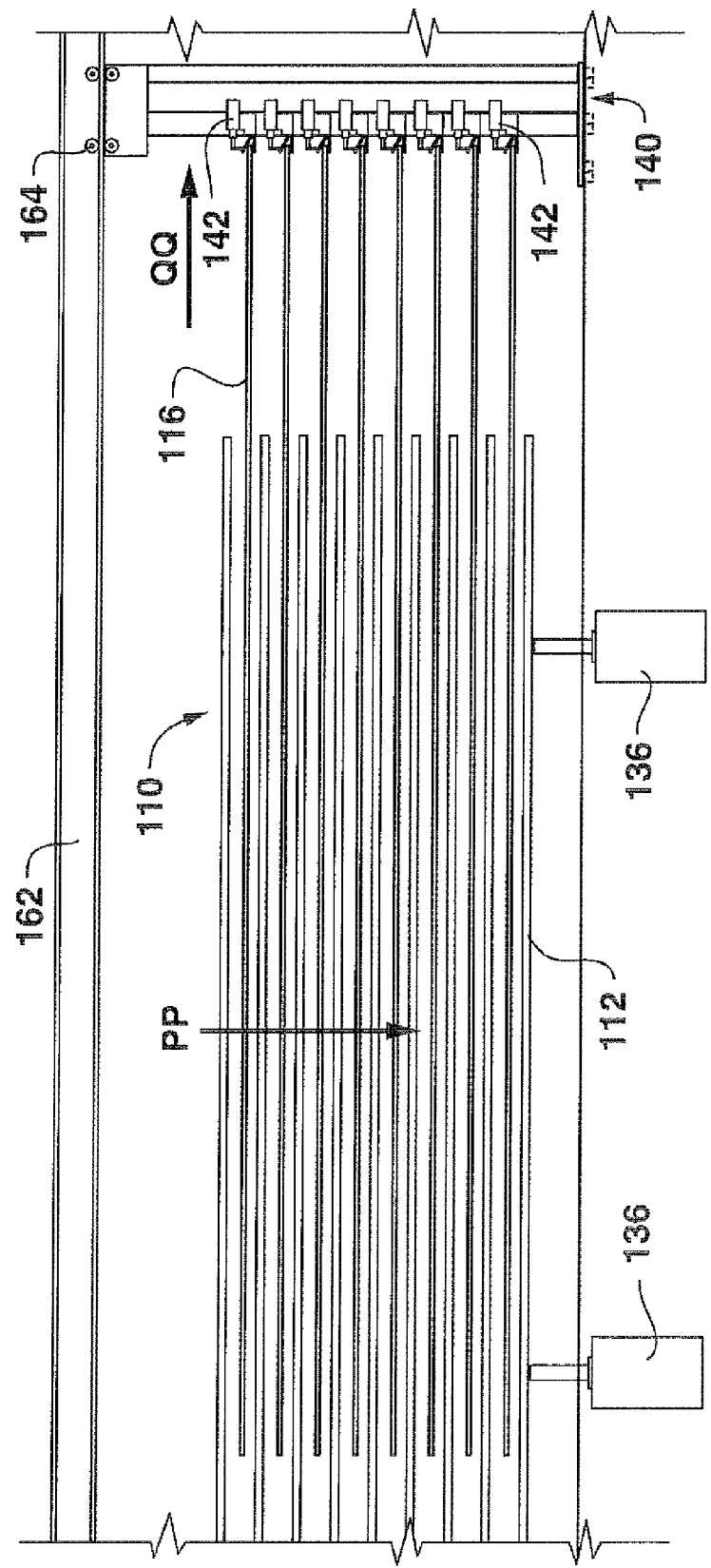

Turning now to FIG. 2J, after a proper mold time has elapsed, mold elements 112 are lowered (arrow PP) to release tread bands 116, which have been severed at second ends 122. Clamp column 140 then pulls tread bands 116 from tread band press 110 for further processing as indicated by arrow QQ. Clamp column 140 is then returned to the position illustrated in FIG. 2B where the process just described can be repeated.

Using the teachings disclosed herein, it will be understood that variations to the apparatus and method described above fall within the spirit and scope of the claims that follow. By way of examples only, a different number of support columns may be used as necessary. A different sequence or spacing between support columns may be used to provide a proper suspension of the tread band. Again, by way of example only, the support columns and clamp column may be moved at the same time and at different speeds, at different times and equal speeds, and a variety of other combinations that provide suspension. The lateral positioning may be accomplished using different methods or apparatus, including the positioning of lateral alignment rollers on different or multiple support columns. It should be understood that the present invention includes these and other various modifications that can be made to the exemplary embodiments of apparatus and method described herein that come within the scope of the appended claims and their equivalents.

The invention claimed is:

1. An apparatus for loading tread onto a tread press, the tread press having a top mold element and a bottom mold element, the tread press defining longitudinal and lateral directions, the apparatus comprising:
   a clamp column that is selectively positionable along the longitudinal direction relative to the top and bottom mold elements;
   a clamping mechanism connected to said clamp column, said clamping mechanism configured for selecting the tread and holding the tread as said clamp column is moved longitudinally so as to position the tread between the top and bottom mold elements; and
   at least one support column that is selectively positionable along the longitudinal direction relative to the top and bottom mold elements, said at least one support column configured for supporting the tread and moving longitudinally into a position between the top and bottom mold elements while suspending the tread therein to prevent permanent stretching of the tread.

2. An apparatus for loading tread onto a tread press as in claim 1, wherein said clamping mechanism comprises a clamp for grasping the end of the tread.

3. An apparatus for loading tread onto a tread press as in claim 1, wherein said clamp column defines a vertical direction and wherein said clamping mechanism is selectively positionable along the vertical direction of said clamp column.

4. An apparatus for loading tread onto a tread press as in claim 1, wherein said at least one support column includes at least one support comprising a plurality of rollers configured for suspending the tread while simultaneously allowing the tread to move relative to said at least one support.

5. An apparatus for loading tread onto a tread press as in claim 4, wherein said at least one support further comprises at least one pair of lateral positioning elements configured for laterally positioning the tread along the bottom mold element as said at least one support column is moved along the longitudinal direction.

6. A device for loading tread onto a tread press, the tread press defining longitudinal and lateral directions, the device comprising:
   a clamp column that is selectively positionable along the longitudinal direction of the tread press;
   at least one clamp connected to said clamp column for grasping the tread as said clamp column moves along the longitudinal direction of the tread press;
   at least one support column that is selectively positionable along the longitudinal direction of the tread press; and
   at least one support connected to said support column, said support configured for suspending the tread over a portion of the tread press as said at least one support column is moved along the longitudinal direction of the tread press to prevent permanent stretching of the tread.

7. A device for loading tread onto a tread press as in claim 6, where said at least one support comprises a plurality of rollers that allow the tread to slide across said at least one support.

8. A device for loading tread onto a tread press as in claim 7, wherein said at least one support further comprises a lateral positioning element for locating the tread into the desired lateral position on the tread press.

9. A device for loading tread onto a tread press as in claim 1, wherein said clamp column defines a vertical direction relative to the tread press, and wherein said at least one clamp is selectively positionable along the vertical direction of said clamp column.

10. A device for loading tread onto a tread press as in claim 6, further comprising a floor track along which said clamp column and said at least one support column are selectively positionable.

* * * * *